(12) United States Patent
Engel et al.

(10) Patent No.: US 6,662,562 B2
(45) Date of Patent: Dec. 16, 2003

(54) METHOD AND DEVICE FOR REGULATING THE BOOST PRESSURE OF AN INTERNAL COMBUSTION ENGINE

(75) Inventors: Gerhard Engel, Stuttgart (DE); Manfred Birk, Oberriexingen (DE); Frank Meier, Kornwestheim (DE); Thomas Bleile, Stuttgart (DE); Peter Rupp, Remseck (DE); Wolfgang Kraemer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,304

(22) PCT Filed: Feb. 16, 2001

(86) PCT No.: PCT/DE01/00586

§ 371 (c)(1),
(2), (4) Date: May 10, 2002

(87) PCT Pub. No.: WO01/66921

PCT Pub. Date: Sep. 13, 2001

(65) Prior Publication Data

US 2003/0010019 A1 Jan. 16, 2003

(30) Foreign Application Priority Data

Mar. 7, 2000 (DE) ......................................... 100 10 978

(51) Int. Cl.$^7$ ............................................. F02D 23/00
(52) U.S. Cl. ........................................................ 60/602
(58) Field of Search ................... 60/600–603

(56) References Cited

U.S. PATENT DOCUMENTS

| | | | | |
|---|---|---|---|---|
| 4,848,086 A | * | 7/1989 | Inoue et al. | 60/602 |
| 5,174,119 A | * | 12/1992 | Hanauer et al. | 60/602 |
| 5,850,737 A | | 12/1998 | Aschner et al. | 60/602 |
| 6,155,049 A | * | 12/2000 | Bischoff | 60/602 |
| 6,263,673 B1 | * | 7/2001 | Schmidt et al. | 60/602 |
| 6,397,597 B1 | * | 6/2002 | Gartner | 60/602 |
| 6,510,691 B1 | * | 1/2003 | Schmid | 60/602 |
| 6,536,214 B2 | * | 3/2003 | Finger et al. | 60/602 |

FOREIGN PATENT DOCUMENTS

| | | | | |
|---|---|---|---|---|
| DE | 37 31 320 | | 4/1988 | 60/602 |
| DE | 41 07 693 | | 9/1992 | |
| DE | 43 12 077 C1 | * | 1/1994 | F02B/037/16 |
| DE | 198 08 832 | | 9/1999 | 60/602 |
| EP | 0 454 943 | | 11/1991 | |

* cited by examiner

*Primary Examiner*—Thomas Denion
*Assistant Examiner*—Thai-Ba Trieu
(74) *Attorney, Agent, or Firm*—Kenyon & Kenyon

(57) ABSTRACT

The turbine of the exhaust gas turbocharger, which is located in the exhaust gas channel of the internal combustion engine, has a variable geometry. The regulation of the boost pressure is performed via an adjustment of the turbine geometry. A very rapid response of the boost pressure regulation to a variable load, with an overshoot of the specified value, which would damage the turbocharger, being avoided, is achieved by determining a manipulated variable for the turbine geometry as a function of the exhaust gas back pressure prevailing in the exhaust gas channel upstream from the turbine.

4 Claims, 1 Drawing Sheet

METHOD AND DEVICE FOR REGULATING THE BOOST PRESSURE OF AN INTERNAL COMBUSTION ENGINE

FIELD OF THE INVENTION

The present invention relates to a method and a device for regulating the boost pressure of an internal combustion engine having an exhaust gas turbocharger whose turbine, which is located in the exhaust gas channel of the internal combustion engine, has an adjustable geometry, with the regulation of the boost pressure occurring via an adjustment of the turbine geometry.

BACKGROUND INFORMATION

As it is provided in, for example, German Published Patent Application No. 41 07 693 or European Published Patent Application No. 04 54 943, boost pressure regulation is typically performed by a controller producing a manipulated variable as a function of the deviation between a specified boost pressure and an actual boost pressure. This manipulated variable is used either for controlling a valve in a bypass which bypasses the turbine of the turbocharger in the exhaust gas channel (see German Published Patent Application No. 41 07 693) or for controlling the adjustable turbine guide vanes of a turbine having variable geometry (see European Published Patent Application No. 04 54 943).

Increasingly higher requirements are placed on, engines in regard to exhaust gas and consumption characteristics. An exhaust gas turbocharger having variable turbine geometry allows an adjustment to the current engine operating point through adjustment of the turbine guide vanes. With this technique, a delayed response of the exhaust gas turbocharger (turbo lag) can be reduced and the efficiency of the engine can be improved at the same time. Overshoots of the boost pressure, which mechanically stress the turbocharger very strongly, often occur during acceleration operations. In addition, excessive closing of the variable turbine geometry in the acceleration phase can result in an unwanted high exhaust gas back pressure, which negatively influences the dynamic response and efficiency of the engine.

SUMMARY OF THE INVENTION

The present invention therefore has as its object the provision of a method and a device for boost pressure regulation of the type cited initially which ensure that the boost pressure follows the course of the desired boost pressure specified value as rapidly as possible in the case of an alternating load, with an overshoot of the boost pressure specified value being avoided to protect the exhaust gas turbocharger from unnecessarily high loads.

The object cited is achieved in that a manipulated variable for the turbine geometry is determined as a function of the exhaust gas back pressure prevailing in the exhaust gas channel upstream from the turbine. The exhaust gas back pressure responds significantly faster than the boost pressure to changed behavior of the controlled system—e.g., speed change, alternating load, change in exhaust gas recirculation—or to malfunctions, e.g., in the servo-system. Therefore, if the exhaust gas back pressure is used according to the present invention to derive a manipulated variable, a very rapid response of the boost pressure regulation to a change in the preset specified boost pressure is achieved.

An advantageous refinement of the method according to the present invention and the device according to the present invention is that a specified exhaust gas back pressure is determined by a first controller from the deviation between a specified boost pressure and an actual boost pressure, and the manipulated variable for the turbine geometry is derived by a second controller from the deviation between the specified exhaust gas back pressure and a measured or estimated actual exhaust gas back pressure.

DETAILED DESCRIPTION

Figure 1:
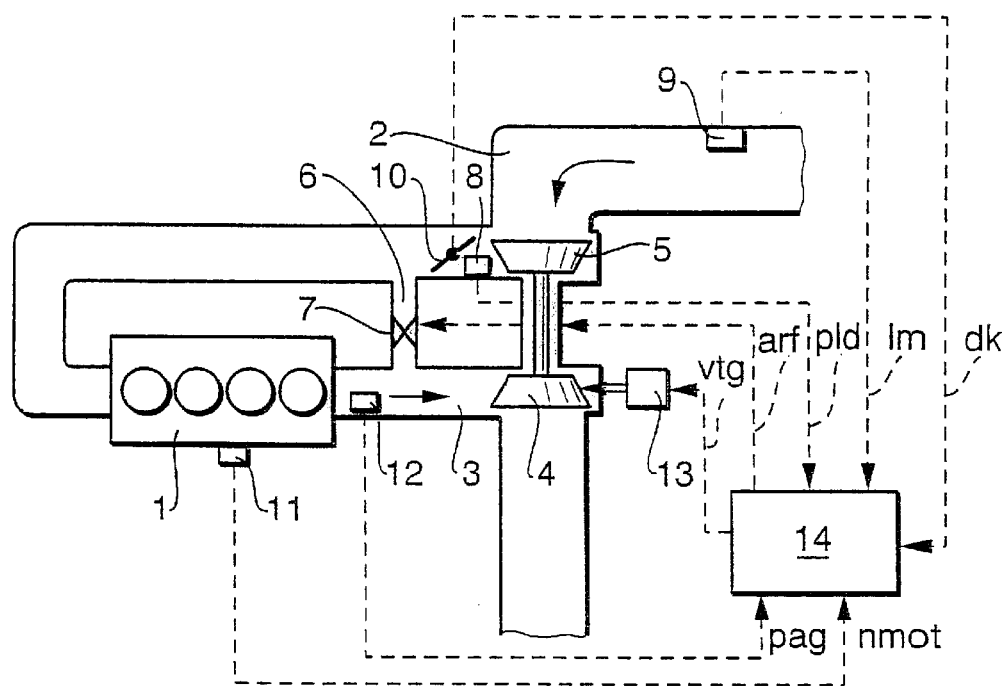
FIG. 1 shows a schematic view of an internal combustion engine having an exhaust gas turbocharger.

FIG. 1 shows an internal combustion engine 1 having an intake channel 2 and an exhaust gas channel 3. Turbine 4 is located in exhaust gas channel 3 and compressor 5 of an exhaust gas turbocharger is located in intake channel 2. Furthermore, the internal combustion engine can be equipped with an exhaust gas recirculation channel 6 which connects exhaust gas channel 3 with intake manifold 2. A controllable valve 7 is located in exhaust gas recirculation channel 6. A pressure sensor 8 for measuring boost pressure pld and an air mass flow sensor 9 for measuring air mass flow intake lm are located in intake manifold 2. In addition, there is a butterfly valve 10 in the intake manifold. A sensor 11 detects the speed nmot of the internal combustion engine, and a pressure sensor 12 in exhaust gas channel 3 measures exhaust gas back pressure pag upstream from turbine 4. An actuator 13 is present which acts on the turbine geometry, i.e., performs an adjustment of the turbine guide vanes. This actuator 13 receives a manipulated variable vtg from a controller 14. Controller 14 uses motor speed nmot, butterfly valve position dk, airflow intake lm, boost pressure pld, and exhaust gas back pressure pag as the input variables to derive manipulated variable vtg for the turbine geometry and a manipulated variable arf for the exhaust gas recirculation valve.

Figure 2:
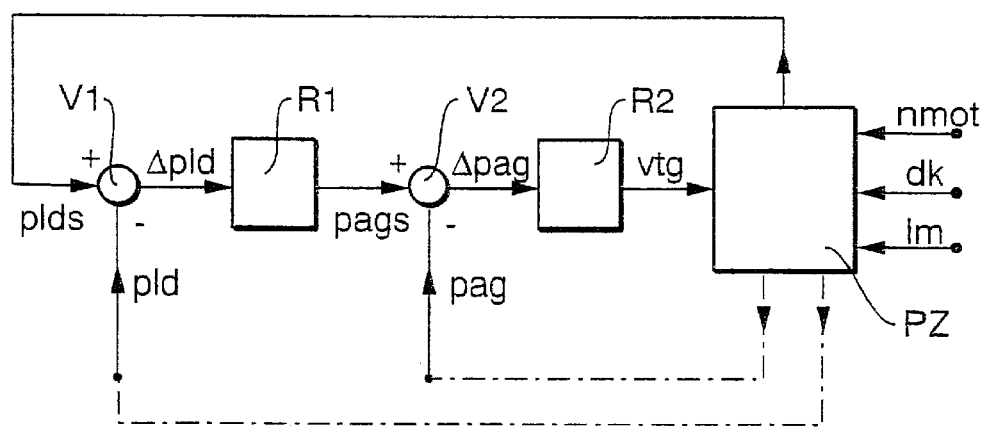
FIG. 2 shows a flowchart for the regulation of the boost pressure.

The procedure that controller 14 uses for deriving manipulated variable vtg for the turbine geometry from the input variables cited will be described in more detail with reference to the flowchart in FIG. 2. A processor PZ determines a specified boost pressure plds from motor speed nmot, butterfly valve setting dk, which reflects the intent of the driver, and possibly other operating quantities of the engine not mentioned here. The derivation of specified boost pressure plds will not be discussed in more detail here, because it is part of the related art. Deviation Δpld between specified boost pressure plds and an actual boost pressure pld is determined in a first node V1. Deviation value Δpld for the boost pressure is supplied to a first controller R1 (e.g., PI or PID controller). The output quantity of first controller R1 corresponds to a specified value pags of the exhaust gas back pressure in exhaust gas channel 3. Deviation Δpag between specified exhaust gas back pressure pags and actual exhaust gas back pressure pag is established in a second node V2. Deviation value Δpag for the exhaust gas back pressure is supplied to a second controller R2, which finally produces manipulated variable vtg for the variable turbine geometry.

Actual boost pressure pld can either be measured by way of pressure sensor 8 in intake manifold 2, or an estimate for the actual boost pressure can be derived by processor PZ from various operating quantities of the internal combustion engine. The dot-dash line in FIG. 2 indicates that actual boost pressure pld is an estimate determined by processor PZ. Actual exhaust gas back pressure pag can be a measured value of pressure sensor 12 in exhaust gas channel 3. However, actual exhaust gas back pressure pag can also be an estimate derived by processor PZ from operating quantities of the internal combustion engine. The dot-dash line leading from processor PZ to second node V2 indicates that actual exhaust gas back pressure pag is an estimate calculated by processor PZ. The calculation of the estimates for actual boost pressure pld and actual exhaust gas back pressure pag will not be discussed in more detail here, because methods known from the related art can be used in this case.

Exhaust gas back pressure pag in exhaust gas channel 3 upstream from turbine 4, and thus also the energy injected into turbine 4, increase through closing of the turbine geometry. For this reason, the turbocharger speed and, at the same time, boost pressure pld in intake manifold 2 increase. If there is exhaust recirculation, as shown in FIG. 1, exhaust gas can reach the intake manifold via exhaust gas recirculation channel 6 by opening valve 7, if exhaust gas back pressure pag is greater than boost pressure pld. If exhaust gas recirculation valve 7 is opened, exhaust gas back pressure pag, and therefore also boost pressure pld in intake manifold 2, drop.

The present invention is based on the observation that exhaust gas back pressure pag responds significantly faster to an adjustment of the turbine geometry than boost pressure pld. Boost pressure pld responds only with a delay equal to the time constant of the exhaust gas turbocharger. Therefore, the dynamic response of a controller for the boost pressure is essentially limited by the moment of inertia of the exhaust gas turbocharger. The time constant occurring in this case is, however, significantly larger than the time constant of several disturbances which act on the system through the time-variant behavior of the controlled system, through opening and closing of exhaust gas recirculation valve 7, or through errors in the guide vane system of turbine 4. Disturbances of the guide vane system of the turbine, changes in the valve lift of exhaust gas recirculation valve 7, or changes in the operating point of the internal combustion engine affect exhaust gas back pressure pag very directly and can therefore be compensated for very rapidly in the lower-level control loop having controller R2. The upper-level control loop having controller R1 is designed as slower than the lower-level control loop having controller R2. However, since boost pressure pld is more sluggish than exhaust gas back pressure pag anyway, this condition is fulfilled automatically.

What is claimed is:

1. A method for regulating a boost pressure of an internal combustion engine including an exhaust gas turbocharger, the turbocharger including a turbine located in an exhaust gas channel of the internal combustion engine, the turbine including an adjustable geometry, the method comprising:

performing a regulation of the boost pressure via an adjustment of the adjustable geometry of the turbine;

determining a manipulated variable for the adjustable geometry of the turbine as a function of an exhaust gas back pressure prevailing in the exhaust gas channel upstream from the turbine;

causing a first controller to establish a specified exhaust gas back pressure from a deviation between a specified boost pressure and an actual boost pressure; and causing a second controller to derive the manipulated variable from a deviation between the specified exhaust gas back pressure and one of a measured actual exhaust gas back pressure and an estimated actual exhaust gas back pressure.

2. The method according to claim 1, further comprising:

measuring an air mass flow intake via an air mass flow sensor disposed in the intake manifold; and acting on the adjustable turbine geometry via an actuator disposed next to the turbine.

3. A device for regulating a boost pressure of an internal combustion engine including an exhaust gas turbocharger, the turbocharger including a turbine located in an exhaust gas channel of the internal combustion engine, the turbine including an adjustable geometry, comprising:

an arrangement for performing a regulation of the boost pressure via an adjustment of the adjustable geometry of the turbine; and a first controller for producing a manipulated variable for the adjustable geometry of the turbine as a function of an exhaust gas back pressure prevailing in the exhaust gas channel upstream from the turbine; and a second controller for determining a specified exhaust gas back pressure from a deviation between a specified boost pressure and an actual boost pressure;

wherein the first controller derives the manipulated variable from a deviation between the specified exhaust gas back pressure and one of a measured actual exhaust gas back pressure and an estimated actual exhaust gas back pressure.

4. The device according to claim 3, further comprising:

an air flow sensor to determine an air mass flow intake in the intake manifold; and an actuator which acts on the adjustable turbine geometry disposed next to the turbine.

* * * * *